United States Patent [19]

Lyckesjö

[11] 4,312,553
[45] Jan. 26, 1982

[54] ELECTRICAL CONNECTION DEVICE

[75] Inventor: Ralph O. Lyckesjö, Harestad, Sweden

[73] Assignee: AB Volvo, Gothenburg, Sweden

[21] Appl. No.: 107,081

[22] Filed: Dec. 26, 1979

[30] Foreign Application Priority Data

Jan. 8, 1979 [SE] Sweden ................. 7900145

[51] Int. Cl.³ .......................................... H01R 13/502
[52] U.S. Cl. ................. 339/60 M; 339/44 M; 339/94 M; 339/136 R; 339/127 R
[58] Field of Search .................. 339/39, 44, 60, 90 R, 339/90 C, 94, 127, 129, 130, 136, 137, 176 M

[56] References Cited

U.S. PATENT DOCUMENTS 2,593,182  4/1952  Quackenbush ................. 339/44 M
3,835,443  9/1974  Arnold et al. ................. 339/90 R

FOREIGN PATENT DOCUMENTS 661512  4/1963  Canada ................. 339/60 M

Primary Examiner—John McQuade
Attorney, Agent, or Firm—Young & Thompson

[57] ABSTRACT

An electric connection device e.g. for coupling together cables between a towing vehicle and a trailer, wherein a first member has an inner soft elastic body in which the end of a cable is molded and to which a casing is attached, e.g. by injection-molding, for fixing plug pins connected to the conductors of the cable. The casing is connected by a bayonet joint to a socket in which a second member is inserted which is primarily soft and elastic to seal effectively against cable and socket.

5 Claims, 2 Drawing Figures

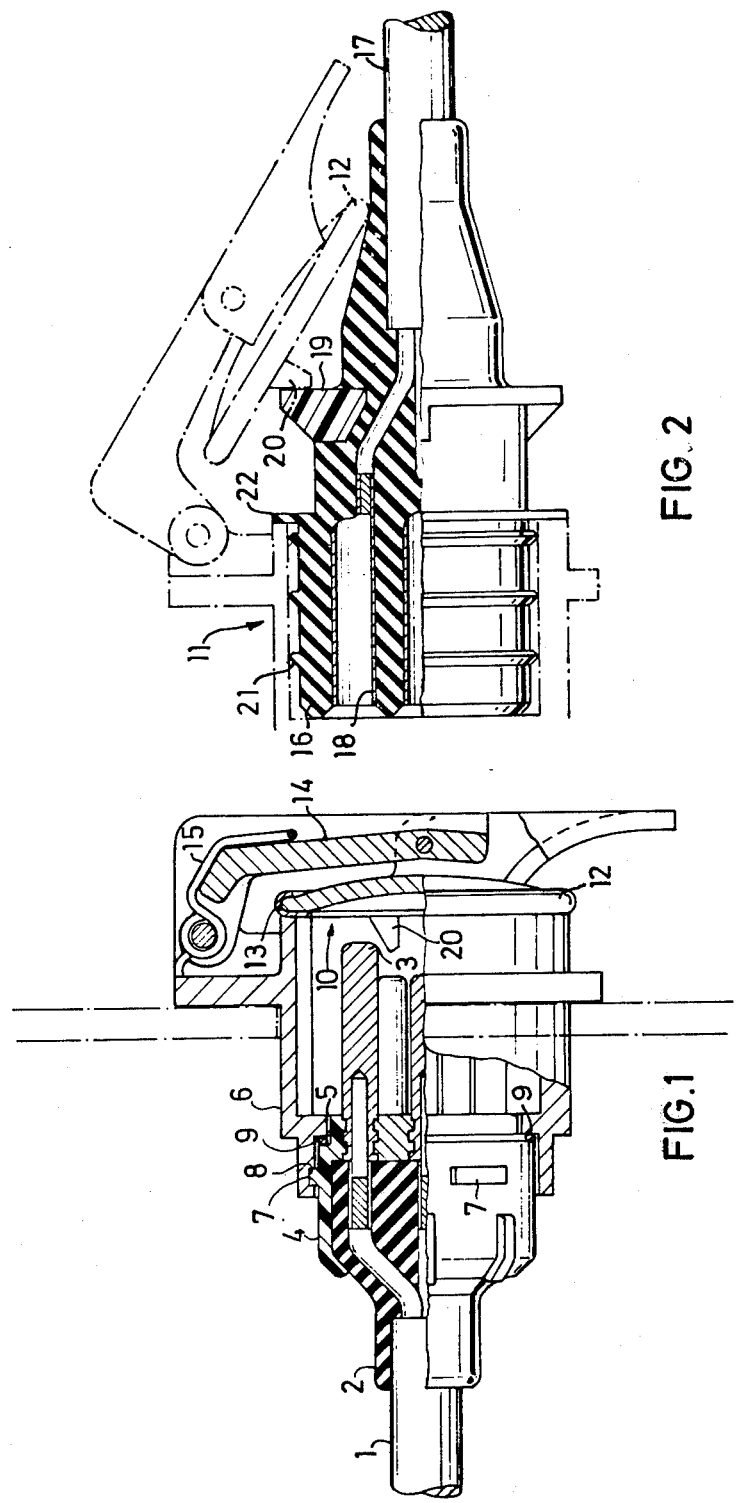

ELECTRICAL CONNECTION DEVICE

The present invention relates to an electrical connection device for connecting electrical cables, especially cables between a towing vehicle and a trailer, comprising a first connecting member with a socket, which has a first opening, and a second connecting member, which can be inserted into said first opening.

One of the problems with electrical connecting devices of this type has always been that water and salt have a tendency to penetrate to the plug means of the cable ends and thereby cause corrosion, resulting in reduction or complete loss of current. Water has penetrated both along the cable into the socket and through the opening of the socket due to breaks in the seal between the edge of the opening and the second connecting member. Attempts have been made to solve the problem of leakage between the cable and the socket with the aid of various types of rubber hoods, but they have not proved effective in practice.

Another problem with known constructions is that if dirt should penetrate to the plug means in the socket through the opening, for example because the cover which normally seals off the opening when the second connection member is not connected, does not seal completely against the edge of the opening, then it is practically impossible to clean the plug means. Finally, it is a disadvantage that the entire ifrst connecting member must be replaced if only one part, the cover for example, is damaged. In this case, one must always consider the risk of incorrect coupling of the cable to the plug means of the new member.

The purpose of the present invention is to achieve a connection device of the type described in the introduction, which will eliminate the above-mentioned disadvantages.

This is achieved according to the invention by the first connecting member having an inner part made of soft elastic material, in which one end of a cable is embedded, and a surrounding casing of rigid material which is fixed to the inner elastic part, that the socket has a second opening situated opposite to the first opening, in which second opening the casing can be inserted, so that plug means joined to said cable end point towards the first opening, and that the inside of the socket and the outside of the casing have means which cooperate with each other to achieve a releasable connection between the casing and the socket.

By constructing the connection device in this manner, several essential advantages are achieved. In the first place, moisture and water cannot come in via the cable. In the second place, the plug means are easily cleaned by virtue of the fact that they also come out of the socket when the casing is released and taken out. This permits replacement of only the socket if it or its cover, for example, should be damaged. In the subsequent reassembly, there is no risk of wrong connection of the cable wires. Finally, the construction according to the invention relieves the load on the cable, so that it can be bent at relatively sharp angles.

The connection device according to the invention is described in more detail below with reference to the example shown in the accompanying drawing, in which FIG. 1 shows a partial longitudinal section of the first connection member as seen from the side, and FIG. 2 shows a partial longitudinal section of the second connection member as seen from the side.

The first connecting member is intended to be fastened to a vehicle frame portion, as indicated with the dash-dot lines. The numeral 1 designates a cable, the stripped end of which is embedded in an inner part 2 of soft elastic material, e.g. injection-molded soft PVC. Plug pins 3 are pressed onto the stripped ends of the conductors, and the pins 3 are then fixed in a casing 4 of rigid material, which is fixed to the inner soft part 2. For example, the casing can consist of an amino plastic, unsaturated ester plastic or styrene plastic, which has been injection-molded over the inner part 2. The casing 4 is inserted into an opening 5 in a socket 6 and has peripheral ribs 7 on its outside, which engage corresponding grooves 8 in the socket 6. The ribs 7 and the grooves 8 form a bayonet joint, whereby the casing 4 is easily released from the socket 6. An O-ring 9 is arranged between opposing flange edges of the casing 4 and the socket 6 and acts as both a spring means for the bayonet joint and as a sealing means.

The socket 6 has an opening 10 in which the second connecting member 11, shown in FIG. 2, is intended to be inserted. When the second member 11 is not inserted in the socket 6, the opening 10 is closed off by a cover 12 with a seal 13. The cover 12 is articulated at its center on an arm 14, which is in turn articulated on the socket 6. A spring 15 is arranged between the socket and the arm 14, and this spring 15 biases the arm clockwise, as seen in FIG. 1, so that the cover with its seal is pressed against the edge of the opening. This suspension of the cover 12 provides an even pressure around the edge, thus preventing the cover from leaving a small opening at its edge away from the arm joint.

The second member 11, shown in FIG. 2, consists primarily of a body 16 of soft elastic material, e.g. soft PVC or polyurethane, which is injection-molded over the end of a cable 17. Rolled sheet metal sleeves 18 are pressed over the stripped cable conductor ends, and they form contact sleeves for the plug pins 3 in the first member. Since the sleeves are embedded in the elastic plastic material, the material has a spring action which assures sufficient contact pressure between the pins 3 and the sleeves 18. A ring 19 of hard plastic, for example, is molded into the soft body 16. This ring serves both as an abutment for a stop 20 arranged on the cover, which assures that the second member will not come loose unintentionally from the first member, and as a handle for pulling out the second member. Finally, the soft body 16 has on its outer surface thin peripheral flanges 21 and a sealing cuff 22, which seal against the inner wall of the socket 6 and against the edge of the opening 5.

What I claim is:

1. In an electrical connection device for connecting electrical cables, comprising a first connecting member with a socket which has a first opening, a second connecting member which can be inserted into said first opening; the improvement in which the first connecting member has an inner part of soft elastic material in which an end of a cable is embedded, and a surrounding casing of rigid material, which is fixed to the inner elastic part, the socket having a second opening opposite the first opening, the casing being insertable in said second opening so that plug means, connected to said cable end, point towards the first opening, and the inside of the socket and the outside of the casing having means cooperating with each other to achieve a releasable connection between the casing and the socket.

2. Connection device according to claim 1, in which said cooperating means on the socket and the casing form a bayonet joint.

3. Connection device according to claim 2, and an O-ring is laid between facing flange edges of the socket and the casing to serve as a spring and sealing member.

4. Connection device according to claim 1, in which the elastic inner part is injection-molded over the end of the cable and the rigid casing is injection-molded over the inner part.

5. Connection device according to claim 1, in which the second connecting member comprises a body of soft elastic material, in which a cable end is embedded and which is insertable in the first opening of the socket to seal against the inner wall of the socket.

* * * * *